United States Patent
Durak et al.

(10) Patent No.: US 12,306,931 B2
(45) Date of Patent: May 20, 2025

(54) COMPUTERIZED SYSTEMS AND METHODS FOR SECURE EXECUTION AND OFFLOADING OF COMPUTATIONS BETWEEN TRUSTED AND UNTRUSTED DEVICES

(71) Applicant: Robert Bosch GmbH, Stuttgart (DE)

(72) Inventors: Betül Durak, Redmond, WA (US); Stefan Gehrer, Pittsburgh, PA (US); Jorge Guajardo Merchan, Pittsburgh, PA (US); Sven Trieflinger, Renningen (DE); Christian Zimmermann, Stuttgart (DE)

(73) Assignee: Robert Bosch GmbH (DE)

( * ) Notice: Subject to any disclaimer, the term of this patent is extended or adjusted under 35 U.S.C. 154(b) by 456 days.

(21) Appl. No.: 17/867,945

(22) Filed: Jul. 19, 2022

(65) Prior Publication Data
US 2024/0028705 A1    Jan. 25, 2024

(51) Int. Cl.
*G06F 21/53* (2013.01)

(52) U.S. Cl.
CPC ........ *G06F 21/53* (2013.01); *G06F 2221/031* (2013.01)

(58) Field of Classification Search
CPC .............. G06F 21/53; G06F 2221/031; G06F 2009/45587; G06F 21/78; H04L 2209/127; H04L 63/105
See application file for complete search history.

(56) References Cited

U.S. PATENT DOCUMENTS

| | | | |
|---|---|---|---|
| 11,443,182 B2 * | 9/2022 | Gu | G06N 3/063 |
| 12,032,690 B2 * | 7/2024 | Hoogerbrugge | G06N 3/08 |
| 2015/0269394 A1 * | 9/2015 | Bringer | H04L 63/0861 726/26 |
| 2020/0082087 A1 * | 3/2020 | Simmons | G06F 21/6245 |
| 2022/0405383 A1 * | 12/2022 | Liu | G06N 3/0499 |
| 2023/0094125 A1 * | 3/2023 | Rogers | G06F 21/53 713/190 |

FOREIGN PATENT DOCUMENTS

WO    WO-2023195983 A1 *    10/2023    ........... G06F 16/254

OTHER PUBLICATIONS

Golic et al., (2003) Multiplicative masking and power analysis of AES. In: Kaliski BS Jr, Koç ÇK, Paar C (eds) CHES 2002. LNCS, vol. 2523. Springer, Heidelberg, pp. 198-212 (Year: 2003).*
Tramèr, Florian, et al., "Slalom: Fast, Verifiable and Private Execution of Neural Networks in Trusted Hardware," ICLR 2019, arXiv:1806.03287v2 [stat.ML] Feb. 27, 2019, 19 pages.

* cited by examiner

*Primary Examiner* — Lizbeth Torres-Diaz
(74) *Attorney, Agent, or Firm* — Dickinson Wright PLLC (57) ABSTRACT

Disclosed are systems and methods for a computerized framework that provides an improved, secure computational environment between trusted and untrusted devices (e.g., a Trusted Execution Environment (TEE) and graphics processing unit (GPU), respectively) for executing and offloading Convolutional Neural Network (CNN) computations and operations. The disclosed framework can operate to perform such secure offloading and processing not only during inference computations of the CNN, but also during training of the CNN. The disclosed framework operates to enable training and execution of CNN models, whereby the data used for such operations are held securely while they are in use, in transit (e.g., between the TEE and GPU) and while in storage.

20 Claims, 7 Drawing Sheets

FIG. 7

COMPUTERIZED SYSTEMS AND METHODS FOR SECURE EXECUTION AND OFFLOADING OF COMPUTATIONS BETWEEN TRUSTED AND UNTRUSTED DEVICES

FIELD OF THE DISCLOSURE

The present disclosure generally relates to mechanisms for executing convolutional neural networks (CNNs), and more particularly, to an improved computerized framework for securely executing and offloading CNN computations and operations within a cloud infrastructure.

BACKGROUND

Currently, many organizations are moving their computerized operations, data, system designs and overall service suite from on-premise ("on-prem") computing platforms to the cloud. This has led many of these organizations to rely on the foundational technology, functionalities and capabilities of the cloud infrastructure to perform many, if not all, of their computations.

SUMMARY

Reliance on the cloud and its infrastructure to perform operations and computations can provide many technological benefits ranging from the way data is managed and how operations are performed, to the types of machines and/or operating environments that perform such management and operations. For example, cloud infrastructure can enable more scalability, increased accessibility and a more worry-free maintenance environment, among other benefits.

As a result, highly sensitive data (such as, for example, personally identifiable information (PII)), which may not belong to either the business or the cloud provider(s), is encrypted. Such encryption is effectuated for data both in transit and at rest in storage. However, such data is not being encrypted while in use by memory during computation. As such, conventional operating environments are availing malicious actors to opportunities to sensitive data during computations, which runs counter to the mechanisms hosting and/or managing such data.

The ability to protect sensitive data while in-use has never been so critical to service providers due to the regulations enforced to protect individuals' data. In an effort to remedy this, conventional systems have put forth significant amount of effort on redesigning the conventional computing infrastructure to enable confidential computing. The aim of such is protect data that is in-use by performing the computations in an isolated memory, referred to as a Trusted Execution Environment (TEE). TEEs are designed to prevent a malicious actor from accessing the data or modifying the computations. Typically, TEEs are designed as a set of secure instruction codes that are built into Central Processing Units (CPUs) which enable a secure infrastructure and provide secure management of the sensitive and regulated data, thereby assuring organizations and data owners that their data is protected.

One type of application that uses a large amount of sensitive data to execute in a TEE is a convolutional neural network (CNN). CNNs are designed as a set of repeated layers where each layer computes specific operations, such as convolution, computing the maximum of a given set of numbers, mapping negative numbers to zero, and the like.

By way of non-limiting example, a CNN model is designed to specify which layers will run in what order. This designed model is then trained by using millions of input data which are labeled for the network to learn, and thereby output specific model parameters. The trained model, then, is used for inference (e.g., executing the trained model) to output a label for a given input data. Training is more computation demanding and it may take several hours to output the parameters of the network to be used in inference. Inference is a lot faster process once the model is ready from training. Convolutions are the most expensive operations among all the operations any CNN executes.

In conventional computing platforms, the most efficient technique to run the convolution with non-sensitive data is done through graphics processing units (GPUs). This is because convolution operations can be converted into a matrix multiplication and GPUs provide better efficiency than CPUs for this operation. Therefore, in plain computations, training offloads the computations of matrix multiplication from CPUs to the GPUs. However, with confidential computing, when the executions of CNNs are secured in TEEs, offloading from CPU-based TEE to GPU becomes less computationally trivial.

One current technique is known as Slalom, which focuses on computing convolution in CNN for inferences declaring that matrix multiplication is almost too challenging an operation to integrate for secure training. Slalom, which is specifically designed for the inference with CNN, provides a privacy and integrity-preserving method for offloading computations securely from TEEs (e.g. Software Guard Extension (SGX)) to a GPU (e.g., an untrusted environment) in order to speed up the computations. As discussed in more detail below, current iterations of Slalom, however, are burdened by computational limitations with regard to their training and implementation. That is, Slalom's current operational configuration and implementation fall victim to security exposures during training and during offload, and additionally lead to slow performance times (e.g., which is counter to the purpose of offloading operations), thereby precluding secure and efficient operation of CNN models.

The disclosed systems and methods address such shortcomings, among others, by providing a computerized framework that securely executes and offloads CNN computations and operations within a cloud infrastructure. That is, according to some embodiments, as discussed herein, the disclosed framework provides novel mechanisms for securely offloading the matrix multiplication computations from a TEE to a GPU, which, in some embodiments, can be performed for CNN model training. Moreover, in some embodiments, the disclosed framework can operate to hide and protect the weights while working with "all-the-time" updated matrices (e.g., without performing any pre-computation).

As discussed herein, the disclosed framework provides non-native functionality and capabilities that provide an improved Slalom (referred to as "Slalom Plus" for reference purposes only). This improved version has quantifiable improvements and benefits over existing versions, as outlined below, inter alfa.

According to some embodiments, the disclosed systems and methods can operate to improve security of how Slalom operates. That is, the current version of Slalom executes under the assumption that the weights of the model are known and kept public. This ultimately can lead to a weaker system in terms of security. Contrary to this, the disclosed framework operates by hiding and protecting the weights of the model during processing, storage and during training, thereby improving how sensitive data is protected.

In some embodiments, the disclosed systems and methods can extend the secure offloading for computations which trains the model(s). Existing versions of Slalom only work for inference when a trained model is ready to use. Counter to this, the disclosed framework ensures that secure offloading is operational and leveraged for model training processing.

Furthermore, existing versions of Slalom divide the processing of inference into two parts: i) offline phase and ii) online phase. The offline phase is used to make heavy computations which will be used in the online phase. Then, online phase performs only cheap operations during the inference by using pre-computed values from the offline phase. The computations which are made in offline phase are as expensive as full processing running in TEEs without any GPU acceleration. Therefore, in total, Slalom makes a lot more operations than it should, which leads to added expense and resource drain of the operating environments within which it is executing. Indeed, the current version of Slalom only pushes the expensive matrix multiplication to a previous time to make things ready to use and these pre-computed matrices are stored in TEEs, which is another resource drain on the system.

According to some embodiments, the disclosed framework remedies this by not performing any offline/pre-computation phase. The disclosed framework does not use any additional memory to store large data to be used in online phase, either. Therefore, the disclosed systems and methods evidence a more computationally efficient, more accurate and less expensive iteration of existing Slalom versions.

By way of a non-limiting example, according to some embodiments, given two matrices X and W of sizes a×b and b×c respectively, the total time complexity of existing Slalom operations, including pre-processing, is $O(a*b*c+a*b)$ with memory complexity $O(a*b)$. As evidenced by the disclosure herein, the disclosed framework's improved Slalom configuration and operation has a time complexity of $O(r*(a2+b2+c2))$, where "r" is a small scalar such as 3, for example, with no memory complexity requirement. Thus, the system operates more efficiently while ensuring, and improving upon, the operational standards of the cloud for securing data while in use, in addition to during transit and at rest.

While the discussion herein will focus on the training and executing of CNNs, it should not be construed as limiting, as one of ordinary skill in the art would understand that other forms of known or to be known Deep Neural Networks (DNNs) can be utilized according to the disclosed systems and methods without departing from the scope of the instant disclosure.

According to some embodiments, a method is disclosed that provides secure execution and offloading of CNN computations and operations within a cloud infrastructure.

In accordance with one or more embodiments, the present disclosure provides a non-transitory computer-readable storage medium for carrying out the above mentioned technical steps. The non-transitory computer-readable storage medium has tangibly stored thereon, or tangibly encoded thereon, computer readable instructions that when executed by a device, cause at least one processor to perform a method that provides secure execution and offloading of CNN computations and operations within a cloud infrastructure.

In accordance with one or more embodiments, a system is provided that comprises one or more computing devices and/or apparatus configured to provide functionality in accordance with such embodiments. In accordance with one or more embodiments, functionality is embodied in steps of a method performed by at least one computing device and/or apparatus. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Moreover, a network can also refer to an automotive network, such as, for example, a network where the nodes are vehicles (or autonomous vehicles), a network where the nodes are vehicles and the server is a remote computer in a cloud infrastructure, and the like. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.1 lb/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device, referred to as user equipment (UE)), may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device (UE) may vary in terms of capabilities or features. The disclosed (and claimed) subject matter is intended to cover a wide range of potential variations, such as a web-enabled client device or previously mentioned devices that may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example. Moreover, the disclosed (and claimed) subject matter is also intended to cover devices that utilize, rely on and/or incorporate automotive electronic control units (ECUs), automotive gateways, vehicle computers, and/or any other type of known or to be known component that can part of an electronic vehicle (EV) and/or its operating system.

Figure 1:
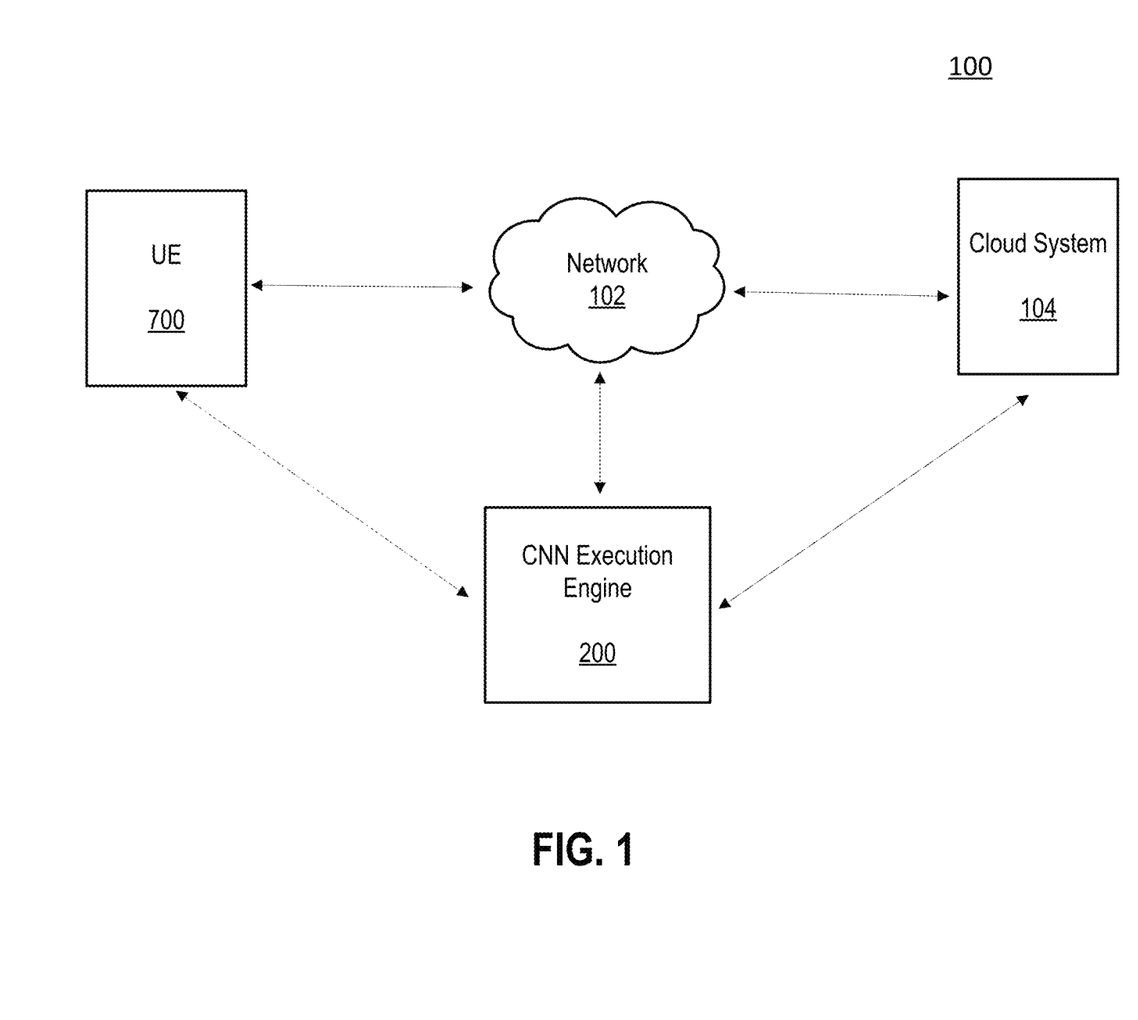
FIG. 1 is a block diagram of an example configuration within which the systems and methods disclosed herein could be implemented according to some embodiments of the present disclosure.

With reference to FIG. 1, system (or framework) 100 is depicted which includes UE 700 (e.g., a client device), network 102, cloud system 104 and CNN execution engine 200. UE 700 can be any type of device, such as, but not limited to, a mobile phone, tablet, laptop, personal computer, sensor, Internet of Things (IoT) device, autonomous machine, and any other device equipped with a cellular or wireless or wired transceiver. Further discussion of UE 700 is provided below at least in reference to FIG. 7.

Network 102 can be any type of network, such as, but not limited to, a wireless network, cellular network, the Internet, automotive network, and the like (as discussed above). As discussed herein, network 102 can facilitate connectivity of the components of system 100, as illustrated in FIG. 1.

Cloud system 104 can be any type of cloud operating platform and/or network based system upon which applications, operations, and/or other forms of network resources can be located. For example, system 104 can correspond to a service provider, network provider, vehicle security operations center (VSOC), content provider and/or medical provider from where services and/or applications can be accessed, sourced or executed from. In some embodiments, cloud system 104 can include a server(s) and/or a database of information which is accessible over network 102. In some embodiments, a database (not shown) of system 104 can store a dataset of data and metadata associated with local and/or network information related to a user(s) of UE 700, user(s) and the UE 700, and the services and applications provided by cloud system 104 and/or CNN execution engine 200.

Figure 6:
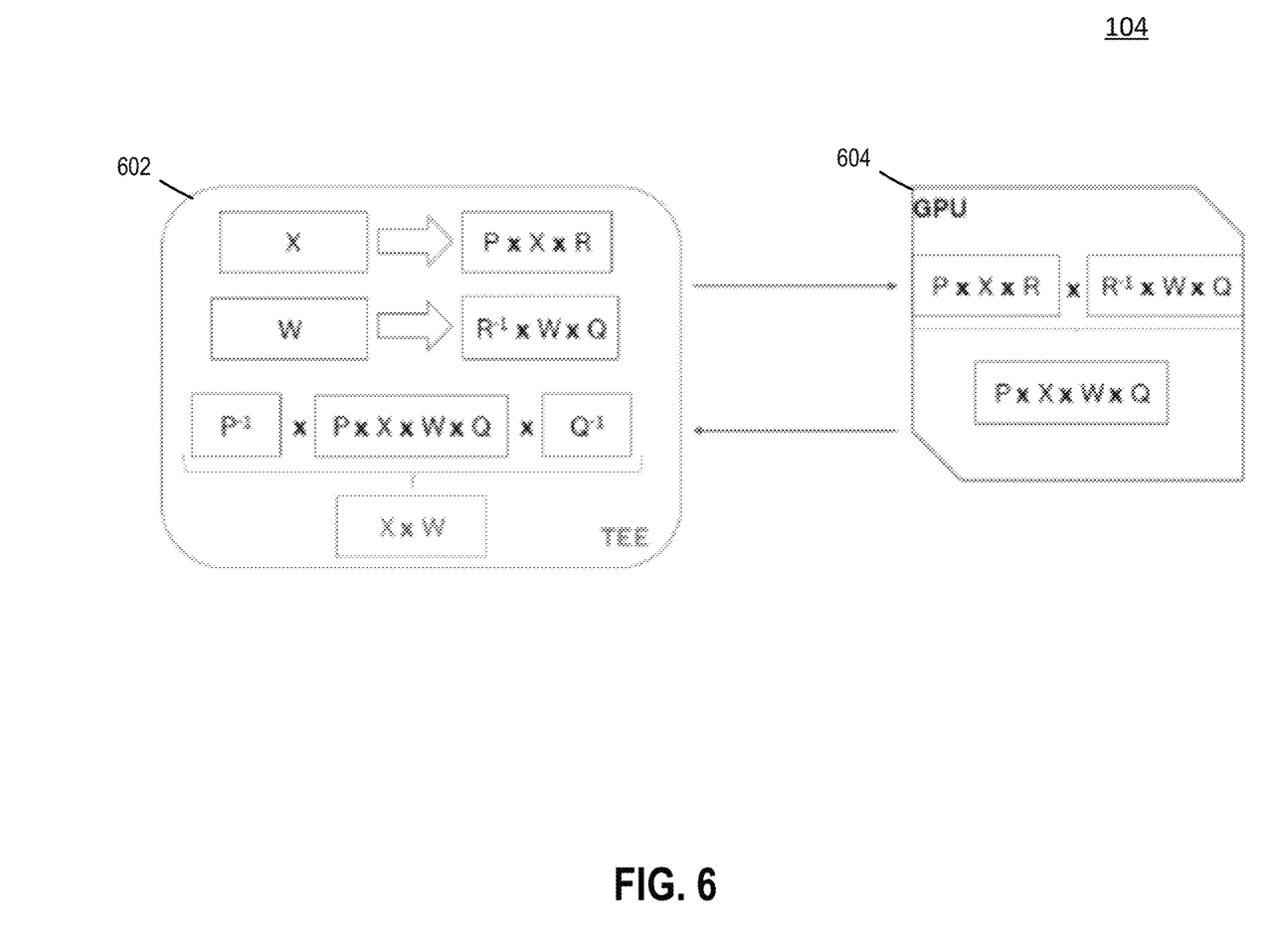
FIG. 6 illustrates a non-limiting example computing environment for performing secure offloading protocol between a TEE and GPU according to some embodiments of the present disclosure.

In some embodiments, cloud system 104 can include one or more CPUs constituting a TEE(s), and one or more GPUs for offloading, as discussed herein. An example infrastructure and operational environment of cloud system 104 is illustrated in FIG. 6, as discussed below.

CNN execution engine 200, as discussed below in more detail, includes components for securely executing and offloading CNN computations and operations within cloud system 104. Embodiments of such functionality and the novel operational configuration that provide such advanced security are discussed infra.

According to some embodiments, CNN execution engine 200 can be a special purpose machine or processor and could be hosted by a device on network 102, within cloud system 104 and/or on UE 700. In some embodiments, engine 200 can be hosted by a peripheral device connected to UE 700.

According to some embodiments, CNN execution engine 200 can function as an application provided by cloud system 104. In some embodiments, engine 200 can function as an application installed on UE 700. In some embodiments, such application can be a web-based application accessed by UE 700 over network 102 from cloud system 104 (e.g., as indicated by the connection between network 102 and engine 200, and/or the dashed line between UE 700 and engine 200 in FIG. 1). In some embodiments, engine 200 can be configured and/or installed as an augmenting script, program or application (e.g., a plug-in or extension) to another application or program provided by cloud system 104 and/or executing on UE 700.

Figure 2:
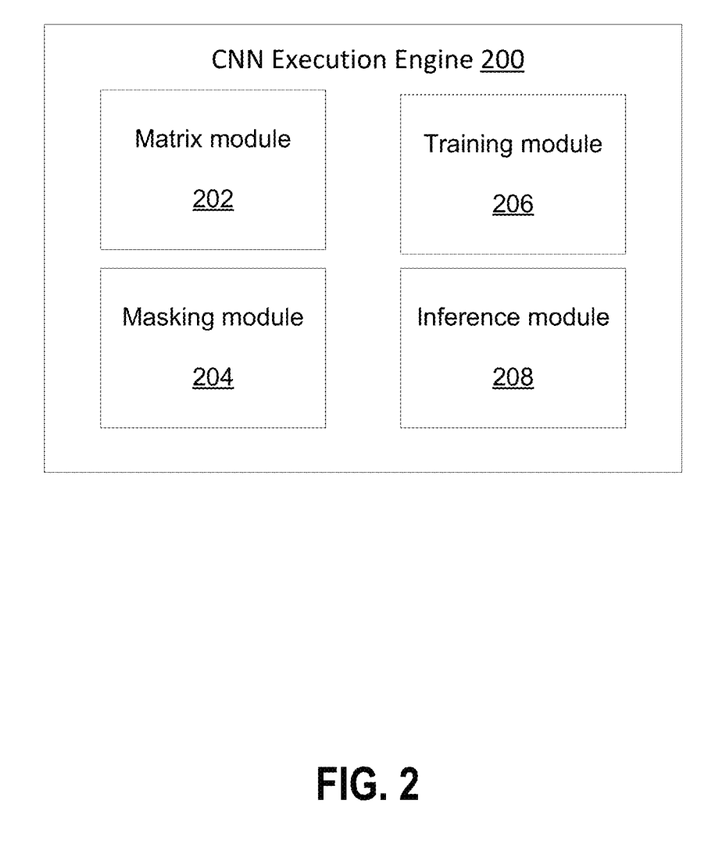
FIG. 2 is a block diagram illustrating components of an exemplary system according to some embodiments of the present disclosure.

As illustrated in FIG. 2, according to some embodiments, CNN execution engine 200 includes matrix module 202, masking module 204, training module 206 and inference module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
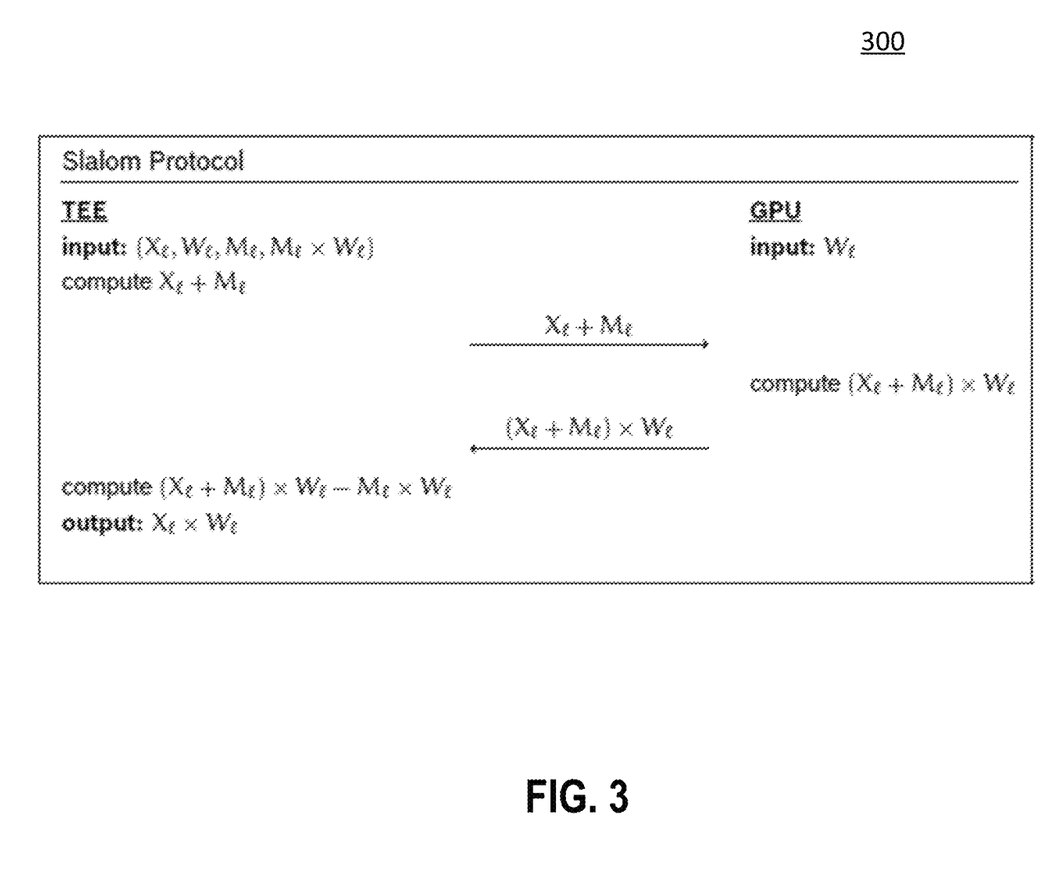
FIG. 3 illustrates a current depiction of Slalom processing as performed by conventional systems and methods.

Turning to FIG. 3, depicted is an existing or conventional (or current) version of Slalom 300. As discussed above, Slalom 300 provides a method designed for offloading computations from TEEs to a GPU (e.g., an untrusted environment) in order to speed up the computations.

By way of background, Slalom 300 focuses on only the convolution layer which boils down to a matrix multiplication. Slalom 300 makes an assumption that the weights, e.g., parameters, of the network are known to the adversary and are stored on GPU.

As depicted in FIG. 3, the methodology for matrix multiplication of Slalom 300 is discussed. For example, suppose that there are "m" layers of convolution. Let $X_\ell$ be the input matrix and $W_\ell$ be the weight matrix for $\ell^{th}$ layer. Let $X_\ell$ be a matrix of size a×b, and $W_\ell$ be a matrix of size b×c. The output of convolution layer is $X_\ell \times W_\ell$.

According to traditional embodiments of Slalom 300, the weights are fixed and they remain the same for any number of image classification operations. Therefore, for a random matrix M, precomputing M×W works because Slalom 300 can perform this precomputation for as many random matrix $M_i$ as possible beforehand. Further, Slalom 300 can operate despite iterations where the input matrix is changing for each layer and for each inference. However, in training, neither the weights are fixed nor the input matrices and the internal input matrices are computed on the fly during training.

Thus, Slalom 300 evidences two critical computing problems. First, how to hide the weights; and secondly, how to operate with updated matrices. The first issue presents itself since the weights are known (e.g., public), which can avail a malicious actor to the sensitive input information (e.g., Slalom 300 is vulnerable to model inversion types of attacks, for example). The second issue is based on the requirement that Slalom 300 requires pre-computation. As discussed above, this can create a resource drain on the operating environment (e.g., TEE/GPU), and can be expensive.

Therefore, as discussed below in reference to at least FIGS. 4-6, the disclosed framework, via execution of engine 200, can address these technological issues by creating secure protocols between the CPU (TEE) and GPU that allows for the performance of secure training and inference with CNNs where, inter alfa, the weights are held private, and there is no precomputation (e.g., efficient operations in TEE with no public parameters and no pre-processing).

Figure 4:
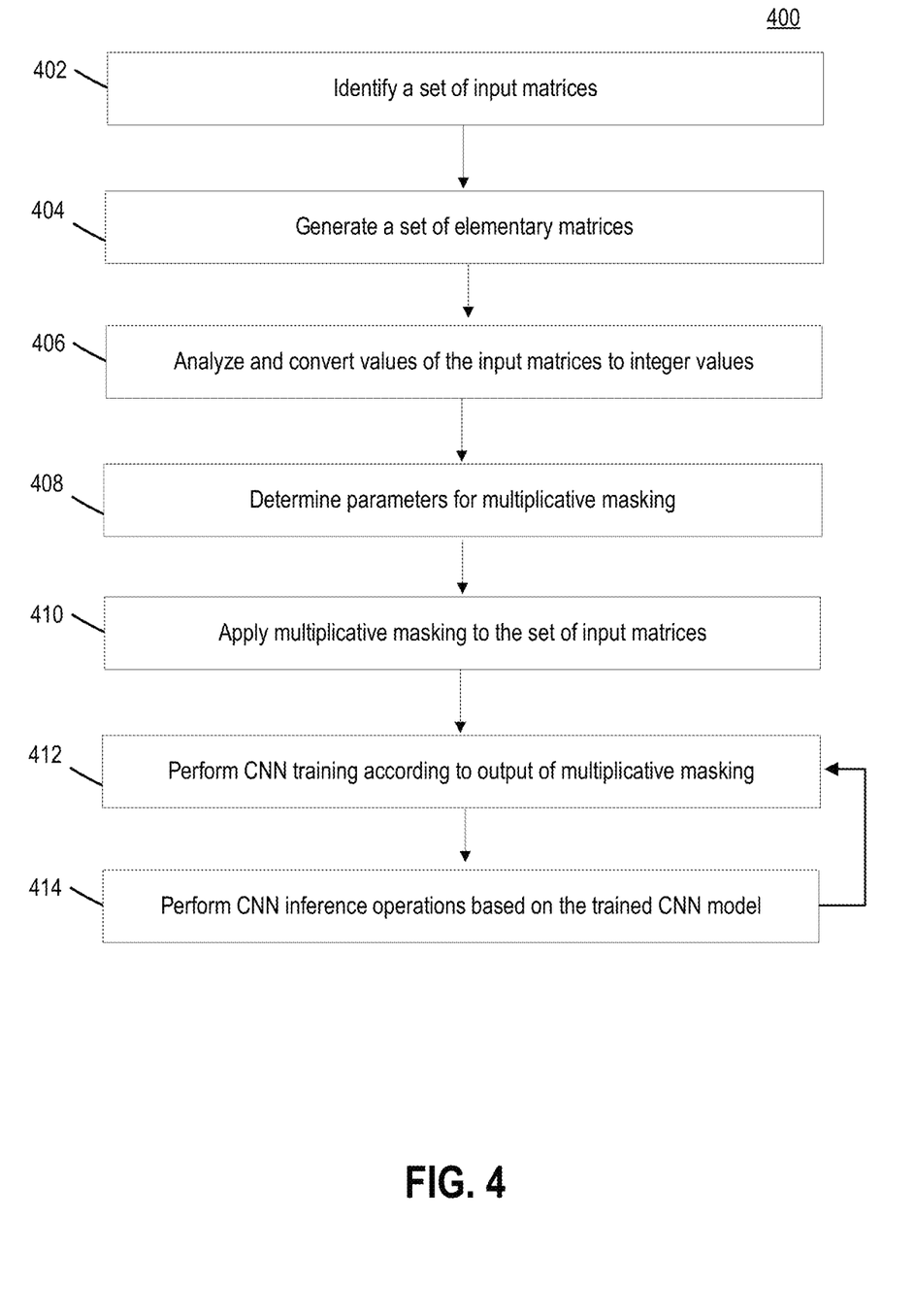
FIG. 4 illustrates an exemplary data flow according to some embodiments of the present disclosure.

Turning now to FIG. 4, Process 400 is disclosed which details non-limiting example embodiments for a computerized framework that provides for Slalom Plus which evidences an improved, secure computational environment between a TEE and GPU for executing and offloading CNN computations and operations. The disclosed framework can operate to perform such secure offloading not only during inference computations of the CNN, but also during training of the CNN, which extends the applicability and capabilities of existing Slalom versions.

According to some embodiments, Steps 402-406 of Process 400 can be performed by matrix module 202 of CNN execution engine 200; Steps 408-410 can be performed by masking module 204; Step 412 can be performed by training module 206; and Step 414 can be performed by inference module 208.

Process 400 begins with Step 402 where engine 200 identifies a set of input matrices (e.g., 2, for example): $X_\ell$. According to some embodiments, each input matrix can include a set of real numbers of a predetermined range (e.g., between 0 and 1, after normalization), with a precision factor of $d_0$.

Accordingly, Step 402 can further involve identifying a weight matrix $W_l$ that includes entries of real numbers with precision factor of $d_1$ bits.

In Step 404, engine 200 generates (or determines) a set of elementary matrices "P" (e.g., "n" elementary matrices). According to some embodiments, elementary matrices refer to matrices whose entries are binary (e.g., 0 or 1), and in some embodiments, have a predetermined number of columns and/or rows (e.g., 1) that is different from the identity matrix. Accordingly, as outlined below, the "n" elementary matrices can have a generated and associated tuple (i, j, $\lambda_k$) In some embodiments, the value of "n" can be based on a ratio of complexity (as discussed below, which can drive efficiency) and security (e.g., a ration of complexity versus security, where a lower "n" equates to less complexity, but less security, and vice versa). In some embodiments, "P" can be a uniform invertible matrix that prevents leakage of data into a kernel space.

According to some embodiments, Step 404 can operate by selecting random indices "i" and "j" for an (a×a) matrix and a random scalar $\lambda$. "n" can be parameterized with a, b, or c. Rather than generating indices iteratively for the elementary matrices, since this could cause operations to be merged and weaken the security of such operations, engine 200 can generate a sequence of n+1 indices ($i_0, i_1, \ldots, i_n$), such multiplication from a first direction (e.g., from the left, for example), then from a second direction (e.g., from the right, for example), can involve: the first operation multiplies $i_0^{th}$ row with $\lambda_0 0$, and adds it to $i_1^{th}$ row: the second operation multiples ($i_1^{th}$ row with $\lambda_1$, and adds it to $i_2^{th}$ row, and so on. (It should be understood that the operations respective each row can be performed for the columns as well).

Thus, $P = Pi_n i_{n-1}(\lambda_n) \times \ldots \times Pi_2 i_1(\lambda^1) \times Pi^1 i^0(\lambda^0)$ for the multiplication from the left, and $Q = Qi_0 i_1(\lambda_0) \times Qi_1 i_2(\lambda_1) \times \ldots \times Qi_{n-1} i_n(\lambda_n)$ for the multiplication from the right. This sequence of indices can be an ordered with a constant number of rotations. It means that to generate P, engine 200 can take (0, 1, ... a-1, 0, 1, ..., a-1, ..., a-1) with n=r*a, where "r" is the number of rotations. According, in some embodiments, R and Q are generated similarly.

According to some embodiments, Step 404 further involves generating the value of the scalar(s) $\lambda_k$ from an Advanced Encryption Standard (AES) block cipher in Counter (CTR) mode with a random key. The output of the mode of operations can be a sequence of bits which engine 200 can translate into an element $\mathbb{Z}_q$, with "q" being an odd prime, as utilized infra.

In Step 406, engine 200 can convert the real number values of the input matrices to integer values. Such conversion can be performed because it is more computationally efficient and accurate to compute with integers rather than real numbers, as real numbers can lead to computational difficulties in generating real valued scalars (e.g., $\lambda$), uniformly at random.

According to some embodiments, in order to convert the real numbers into integers, all the values can be multiplied with a factor of $2^{d0}$ for $X_\ell$. In some embodiments, when a weight matrix ($W_\ell$) is configured with real numbers, engine 200 can multiply its values with a factor of $2^{d1}$. According to some embodiments, the integer matrix entries in $X_\ell$ and $W_\ell$ can be bounded by an integer B. Therefore, the multiplication output can be bounded by b*$B_2$ within the finite field Zq, where q is an odd prime that is larger than b*$B_2$. Accordingly, the integers can be converted (or mapped or scaled) to a finite field of integers of $\mathbb{Z}_q$.

According to some embodiments, after all the computations are performed with integers (e.g., the steps of Process 400, and the training and inference operations, for example), the result of the multiplication masking can be mapped back to real numbers by dividing the result by mapping factor of $2^{d0+d1}$.

In Step 408, engine 200 can determine parameters for performing multiplicative masking for the input matrices. In some embodiments, such parameters can correspond to a generation of multiplicative masks.

According to embodiments of the instant disclosure, since the weights are private and not available for pre-computation (as is in conventional Slalom), additive masking is not a viable option to perform. Therefore, multiplicative masking with "cheap" (or efficient) multiplication with elementary matrices is utilized. This improves the efficiency as well as ensures the security of the values being computed (e.g., $W_l$).

According to some embodiments, Step 408 can involve $P_{ij}(\lambda)$ being set as an (a+a) square identity matrix with $\lambda$ in (i, j)$^{th}$ position. The inverse of $P_{ij}$ is $P^{-1}(\lambda) = P_{ij}(-\lambda,)$, with a square identity matrix with $-\lambda$, in (i, j)$^{th}$ position. In some embodiments, the inversion can be performed with limited (if any) computations by engine 200.

In Step 410, engine 200 applies multiplicative masking to the set of input matrices based on the determined parameters/multiplicative masks (from Step 408).

According to some embodiments, Step 410 can involve multiplication between an input matrix X and $P_{ij}^{(k)}(\lambda_k)$ from left, where $P_{ij}^{(k)}(\lambda_k) \times X$, by definition of an elementary matrix (from Step 404), can be the same matrix as X except that the i$^{th}$ row of X is updated by adding the j$^{th}$ row of X after it is multiplied with kk. According to some embodiments, when multiplication between an input and elementary matrix is made from the right, the operations can become column-wise. This effectively means that $X \times P_{ij}^{(k)}(\lambda_k)$ is the same matrix as X except that the j$^{th}$ column of X is updated by adding with the i$^{th}$ column of X after multiplied with $\lambda_k$. Accordingly, the size of $P_{ij}^{(k)}(\lambda_k)$, if multiplied from the right, would be b×b.

According to some embodiments, for example, Step 410 can involve Q being a (c×c) square matrix formed with "n" sequential elementary operations.

Figure 5:
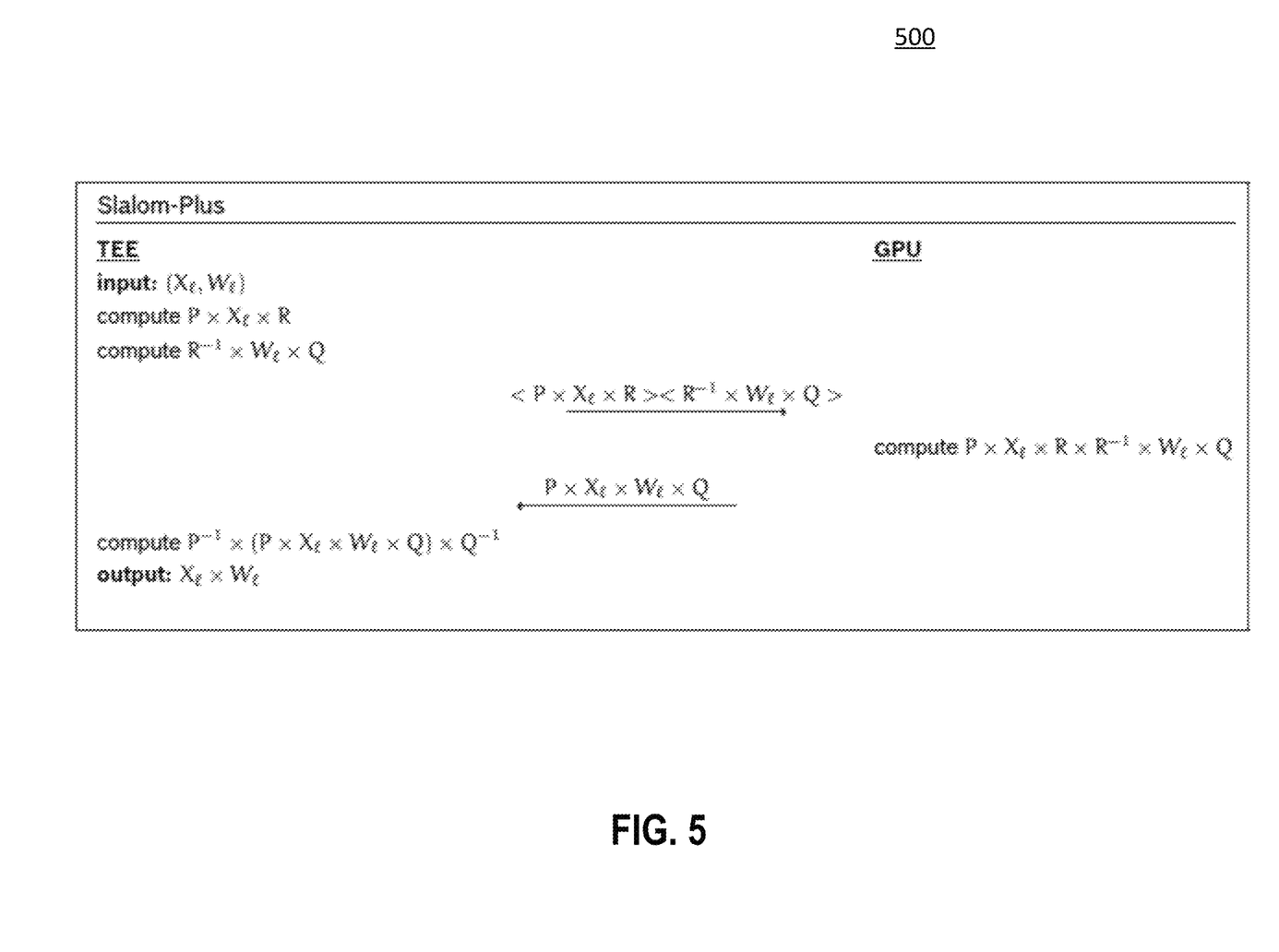
FIG. 5 illustrates a non-limiting example embodiments of improved Slalom processing as detailed in FIG. 3 according to some embodiments of the present disclosure.

In some embodiments, as illustrated in FIG. 5, the creation of multiplicative masks (e.g., parameters), $P \times X_\ell \times R$ and $R^{-1} \times W_\ell \times Q$ (provided by TEE to GPU), and multiplication with inverses to revert back to TEE may be cheaper than the matrix multiplication $X_\ell \times W_\ell$. In some embodiments, the complexity of multiplication of $X_\ell \times W_\ell$ without any optimization is a*b*c. Thus, in some embodiments, engine 200 can compute the complexity of preparing a multiplicative mask, as discussed above, for $X_\ell \times W_\ell$.

In some embodiments, for a square (a×a) matrix $P_{ij}^{(k)}(\lambda_k)$, multiplying it with another matrix X may take "a" multiplications and "a" additions. For example, this may be because the output is computed by multiplying the $j^{th}$ row with $\lambda_k$ and adding it to X's $i^{th}$ row, as discussed above. When a sequence of "n" such multiplications are made, the total complexity of computing $P \times X_\ell \times R$ becomes O(n*(a+b+c)). By the same rationale, computing $R^{-1} \times W_j \times Q$ has a complexity of O(n*(b+c)), and multiplying from left and right with inverses $P^{-1}$ and $Q^{-1}$, respectively, has O(n*a) and O(n*c) complexities, respectively. In some embodiments, in total, the complexity can take on O(n*(a+b)) which is less than a*b*c if "n" is smaller than b*c.

Further, with "r" being a constant to represent a number of "rounds" of elementary operations to generate P, Q, R, in some embodiments: P can be generated with n=r*a operations, Q can be generated with n =r*c operations; and R can be generated with n =r*b operations. Thus, according to some embodiments of Process 400, the total complexity can become $O(r*(a^2+b^2+c^2))$.

Thus, in some embodiments, Step 410's multiplicative masking application can correspond to the compilation of the Slalom Plus algorithm that can then be executed for training and inference of a CNN model by engine 200.

Therefore, having compiled the Slalom Plus algorithm and configuration via the above Steps 402-410 (e.g., as a result of the applying multiplicative masking Step 410), Step 412 can then be performed where a CNN model can be trained. As discussed above, based on the novel configuration of engine 200's Slalom Plus configuration, the training of the CNN model can be performed as a result of an offloading procedure from the TEE to a GPU, and back to TEE.

For example, as illustrated in FIG. 5, depicted is Slalom Plus 500 (as compiled from the above-detailed steps of Process 400), where the TEE can receive input matrices, and perform secure computations for training a CNN model therein, and/or having them transferred/offloaded to the GPU for secure training (where the results are sent back to the TEE).

An example of such processing where the GPU receives information to securely process, and then returns its results back to the TEE is illustrated in FIG. 6. FIG. 6, therefore, depicts a computing environment of cloud system 104 (from FIG. 1, supra), where a TEE 602 (e.g., a CPU) and a GPU 604 communicate based on secure computations they are executing and/or transferring between each other to securely execute, are depicted therein.

Upon training the CNN model, Process 400 can proceed to Step 414 where the CNN model is executed (e.g., inference operations are performed). Such performance can be performed in a similar manner as discussed above in relation to Step 412, as depicted in FIGS. 5 and 6.

According to some embodiments, the inference output from Step 414 can be recursively fed back to engine 200 for the recursive performance of the training of Step 412.

Figure 7:
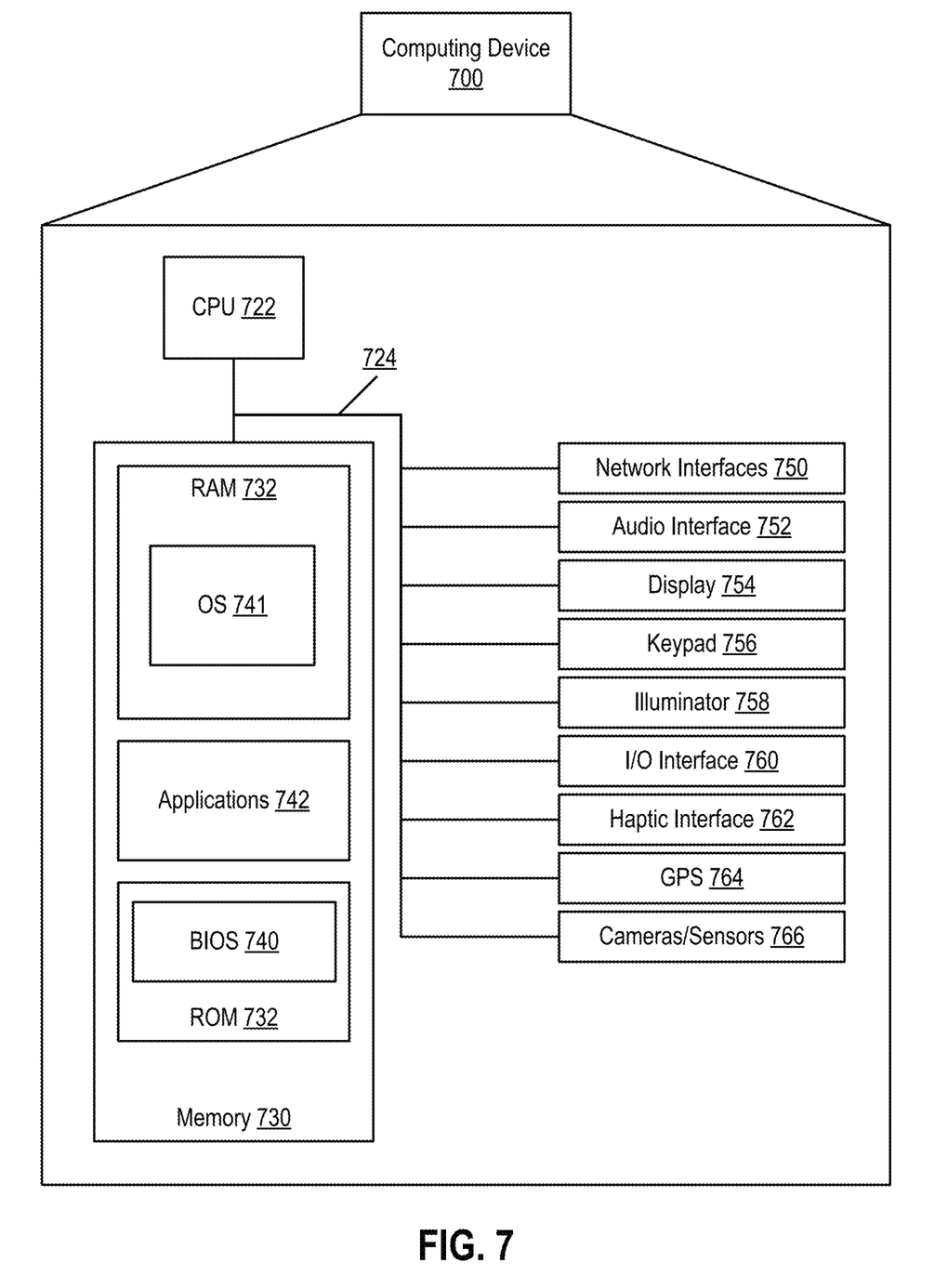
FIG. 7 is a block diagram illustrating a computing device showing an example of a device used in various embodiments of the present disclosure.

FIG. 7 is a block diagram illustrating a computing device 700 (e.g., UE 700, as discussed above) showing an example of a client device or server device used in the various embodiments of the disclosure.

The computing device 700 may include more or fewer components than those shown in FIG. 7, depending on the deployment or usage of the device 700. For example, a server computing device, such as a rack-mounted server, may not include audio interfaces 752, displays 754, keypads 756, illuminators 758, haptic interfaces 762, GPS receivers 764, or cameras/sensors 766. Some devices may include additional components not shown, such as GPU devices, cryptographic co-processors, AI accelerators, or other peripheral devices.

As shown in FIG. 7, the device 700 includes a central processing unit (CPU) 722 in communication with a mass memory 730 via a bus 724. The computing device 700 also includes one or more network interfaces 750, an audio interface 752, a display 754, a keypad 756, an illuminator 758, an input/output interface 760, a haptic interface 762, an optional GPS receiver 764 (and/or an interchangeable or additional GNSS receiver) and a camera(s) or other optical, thermal, or electromagnetic sensors 766. Device 700 can include one camera/sensor 766 or a plurality of cameras/sensors 766. The positioning of the camera(s)/sensor(s) 766 on the device 700 can change per device 700 model, per device 700 capabilities, and the like, or some combination thereof.

In some embodiments, the CPU 722 may comprise a general-purpose CPU. The CPU 722 may comprise a single-core or multiple-core CPU. The CPU 722 may comprise a system-on-a-chip (SoC) or a similar embedded system. In some embodiments, a GPU may be used in place of, or in combination with, a CPU 722. Mass memory 730 may comprise a dynamic random-access memory (DRAM) device, a static random-access memory device (SRAM), or a Flash (e.g., NAND Flash) memory device. In some embodiments, mass memory 730 may comprise a combination of such memory types. In one embodiment, the bus 724 may comprise a Peripheral Component Interconnect Express (PCIe) bus. In some embodiments, the bus 724 may comprise multiple busses instead of a single bus.

Mass memory 730 illustrates another example of computer storage media for the storage of information such as computer-readable instructions, data structures, program modules, or other data. Mass memory 730 stores a basic input/output system ("BIOS") 740 for controlling the low-level operation of the computing device 700. The mass memory also stores an operating system 741 for controlling the operation of the computing device 700.

Applications 742 may include computer-executable instructions which, when executed by the computing device 700, perform any of the methods (or portions of the methods) described previously in the description of the preceding Figures. In some embodiments, the software or programs implementing the method embodiments can be read from a hard disk drive (not illustrated) and temporarily stored in RAM 732 by CPU 722. CPU 722 may then read the software or data from RAM 732, process them, and store them to RAM 732 again.

The computing device 700 may optionally communicate with a base station (not shown) or directly with another computing device. Network interface 750 is sometimes known as a transceiver, transceiving device, or network interface card (NIC).

The audio interface 752 produces and receives audio signals such as the sound of a human voice. For example, the audio interface 752 may be coupled to a speaker and microphone (not shown) to enable telecommunication with others or generate an audio acknowledgment for some action. Display 754 may be a liquid crystal display (LCD), gas plasma, light-emitting diode (LED), or any other type of display used with a computing device. Display 754 may also include a touch-sensitive screen arranged to receive input from an object such as a stylus or a digit from a human hand.

Keypad 756 may comprise any input device arranged to receive input from a user. Illuminator 758 may provide a status indication or provide light.

The computing device 700 also comprises an input/output interface 760 for communicating with external devices, using communication technologies, such as USB, infrared, Bluetooth™, or the like. The haptic interface 762 provides tactile feedback to a user of the client device.

The optional GPS transceiver 764 can determine the physical coordinates of the computing device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS, or the like, to further determine the physical location of the computing device 700 on the surface of the Earth. In one embodiment, however, the computing device 700 may communicate through other components, provide other information that may be employed to determine a physical location of the device, including, for example, a MAC address, IP address, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "data owner", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A computer-implemented method for managing and offloading secure computations comprising:
   identifying, by a processor, a set of input matrices, each input matrix comprising a set of values;
   identifying, by the processor, a weight matrix comprising private values;
   determining, by the processor, a set of elementary matrices, each elementary matrix comprising a tuple, the tuple comprising a set of indices and a scalar;
   determining, by the processor, parameters for multiplicative masking, the parameters corresponding to a first direction of computations and a second direction of computations, wherein the second direction of computations correspond to an inverse of the first direction of computations;
   applying multiplicative masking via an application, by the processor, to the set of input matrices, the weight matrix and the set of elementary matrixes, the application comprising performing multiplicative masking computations based on the determined parameters in the first direction of computations and the second direction of computations;
   executing, based on the application, an algorithm by the processor via a system, the system comprising a Trusted Execution Environment (TEE) associated with a central processing unit (CPU), the system further comprising a graphics processing unit (GPU);
   offloading, by the processor, based on execution of the algorithm, a set of computations associated with the algorithm to be performed by at least one of the TEE and GPU.

2. The method of claim 1, wherein the application further comprises a compilation of the algorithm for executing a neural network model, wherein the execution is a training operation of the neural network model, wherein the training operation is operable on both the TEE and GPU, wherein the algorithm is configured to offload the training operation from the TEE to the GPU based on a complexity of the training operation.

3. The method of claim 1, wherein the application further comprises a compilation of the algorithm for executing a neural network model, wherein the execution is an inference operation of the neural network model, wherein the inference operation is operable on both the TEE and GPU, wherein the algorithm is configured to offload the inference operation from the TEE to the GPU based on a complexity of the inference operation.

4. The method of claim 1, further comprising:
identifying a set of rows associated with the set of indices;
performing a first set of computations, for each row in the set of rows, by multiplying values of a respective row with the scalar in a first direction; and
performing a second set of computations, for each row in the set of rows, by multiplying values of a respective row with the scalar in a second direction,
wherein the determination of the set of elementary matrices are based on the first set of computations and the second set of computations.

5. The method of claim 1, wherein the system is a cloud system comprising the TEE.

6. The method of claim 1, further comprising:
generating, via execution of an Advanced Encryption Standard (AES) block cipher in Counter (CTR) mode with a random key, the scalar.

7. The method of claim 1, wherein a number of matrices in the set of elementary matrices is based on a ratio of complexity values and security protocols.

8. The method of claim 1, wherein the first direction of computations are based at least in part on the determined set of elementary matrices.

9. The method of claim 1, further comprising:
generating a set of multiplicative masks, wherein the multiplicative masking parameters correspond to the set of multiplicative masks.

10. The method of claim 1, wherein the set of values within each input matrix and weigh matrix are real number values that are within a predetermined range, wherein each input matrix is configured with a matrix precision factor, wherein the weight matrix is configured with a weight precision factor.

11. The method of claim 10, further comprising:
identifying, for each input matrix, the real number values;
performing a computation, for each input matrix, by multiplying each real number value by a factor based on the matrix precision factor; and
converting the real number values of each input matrix to integer values based on the computation.

12. The method of claim 10, further comprising:
identifying, for the weight matrix, the real number values;
performing a computation, for the weight matrix, by multiplying each real number value by a factor based on the weight precision factor; and
converting the real number values of the weight matrix to integer values.

13. The method of claim 3, further comprising:
converting integer values of the output of the inference processing by dividing the integer values by a mapping factor, the mapping factor being based on the precision factors of the input matrices and weight matrix.

14. A non-transitory computer-readable storage medium tangibly encoded with computer-executable instructions, that when executed by a processor, perform a method for managing and offloading secure computations comprising steps of:
identifying a set of input matrices, each input matrix comprising a set of values;
identifying a weight matrix comprising private values;
determining a set of elementary matrices, each elementary matrix comprising a tuple, the tuple comprising a set of indices and a scalar;
determining parameters for multiplicative masking, the parameters corresponding to a first direction of computations and a second direction of computations, wherein the second direction of computations correspond to an inverse of the first direction of computations;
via an application, performing multiplicative masking computations based on the determined parameters in the first direction and the second direction, the application further comprising a compilation of an algorithm for executing a neural network model;
executing the algorithm within a system; and
offloading, based on execution of the algorithm, an operation from one processor to another processor based on operation of the neural network model.

15. The non-transitory computer-readable storage medium of claim 14, wherein the system comprises a Trusted Execution Environment (TEE) associated with a central processing unit (CPU), the system further comprising a graphics processing unit (GPU), the execution comprising offloading a set of computations from the TEE to the GPU.

16. The non-transitory computer-readable storage medium of claim 15, wherein the operation is an inference operation of the neural network model, wherein the inference operation is operable on both the TEE and GPU, wherein the algorithm is configured to offload the inference operation from the TEE to the GPU based on a complexity of the inference operation.

17. The non-transitory computer-readable storage medium of claim 14, wherein the instructions further cause the processor to perform:
identifying a set of rows associated with the set of indices;
performing a first set of computations, for each row in the set of rows, by multiplying values of a respective row with the scalar in a first direction; and
performing a second set of computations, for each row in the set of rows, by multiplying values of a respective row with the scalar in a second direction,
wherein the determination of the set of elementary matrices are based on the first set of computations and the second set of computations.

18. A device comprising:
a processor programmed to:
identify a set of input matrices, each input matrix comprising a set of values;
determine parameters for multiplicative masking, the parameters corresponding to a first set of computations and a second set of computations, wherein the second set of computations are different than the first set of computations;
perform multiplicative masking computations based on the determined parameters of the first set of computations and the second set of computations, the application further comprising a compilation of an algorithm for executing a neural network model;
execute the algorithm within a system, the system comprising a Trusted Execution Environment (TEE) associated with a central processing unit (CPU), the system further comprising a graphics processing unit (GPU), the execution comprising an operation of the neural network model being performed; and
offload, based on the operation, a set of computations to be performed by at least one of the TEE and GPU.

19. The device of claim 18, wherein the operation is a training operation of the neural network model, wherein the training operation is operable on both the TEE and GPU, wherein the algorithm is configured to offload the training operation from the TEE to the GPU based on a complexity of the training operation.

20. The device of claim 18, wherein the operation is an inference operation of the neural network model, wherein the inference operation is operable on both the TEE and GPU, wherein the algorithm is configured to offload the inference operation from the TEE to the GPU based on a complexity of the inference operation.

* * * * *